United States Patent [19]
Gaiski

[11] Patent Number: 6,067,509
[45] Date of Patent: May 23, 2000

[54] METHOD FOR GENERATING COMPUTED STATISTICAL CONTROL CHARTS FROM PELT GAGE THICKNESS MEASUREMENTS

[76] Inventor: Stephen N. Gaiski, 595 Forest, Suite 1B, Plymouth, Mich. 48170

[21] Appl. No.: 09/040,840

[22] Filed: Mar. 18, 1998

[51] Int. Cl.[7] .................................................. G01B 17/02
[52] U.S. Cl. ........................................... 702/170; 324/230
[58] Field of Search ........................... 702/170; 324/229, 324/230, 234; 73/801

[56] References Cited

U.S. PATENT DOCUMENTS

| | | | |
|---|---|---|---|
| 5,237,870 | 8/1993 | Fry et al. | 73/588 |
| 5,271,274 | 12/1993 | Khuri-Yakub et al. | 73/597 |
| 5,504,695 | 4/1996 | Yoshida et al. | 364/563 |
| 5,528,510 | 6/1996 | Kraft | 364/468 |
| 5,557,970 | 9/1996 | Abbate et al. | 73/597 |
| 5,737,227 | 4/1998 | Greenfield et al. | 364/464.1 |
| 5,751,608 | 5/1998 | Koch et al. | 364/563 |
| 5,893,050 | 4/1999 | Park et al. | 702/97 |
| 5,924,058 | 7/1999 | Waldhauer et al. | 702/170 |
| 5,930,744 | 7/1999 | Koch et al. | 702/170 |

*Primary Examiner*—Patrick Assouad
*Attorney, Agent, or Firm*—Charles W. Chandler

[57] ABSTRACT

A method for determining and generating a computer generated picture of the pattern of the thickness of a selected layer of a multi-layer coating on a workpiece at selected locations and taken at a plurality of timed segments, by a Pelt Gage.

14 Claims, 3 Drawing Sheets

METHOD FOR GENERATING COMPUTED STATISTICAL CONTROL CHARTS FROM PELT GAGE THICKNESS MEASUREMENTS

BACKGROUND OF THE INVENTION

This invention is related to a computer-operated process for graphically determining whether the average thickness of individual or multiple layers of a multi-layer coating detected by a Pelt Gage at a plurality of spaced locations on several workpieces considering selected parameters, are within the range of acceptable thickness.

A Pelt Gage (pulse/echo layer thickness Gage) is a computer controlled ultra-sonic coating layer thickness measurement system. The Pelt Gage is used in industrial applications to measure the thickness of multiple layers of coatings on either metallic or plastic substrates. The Pelt Gage initiates a thickness measurement by generating a very short electrical pulse. An ultra-sonic transducer converts this electrical pulse to a mechanical or acoustic pulse. The transducer is acoustically coupled to the sample being measured so that an appreciable portion of the pulse energy is transmitted into the sample coating layers. As the acoustic pulse propagates through the coating layers, reflections or echoes are produced each time the pulse crosses the boundary between layers. The amount of energy reflected back at the interface between two coatings or materials is related to the difference in the acoustic properties of the materials.

The Pelt Gage measures layer thickness by precisely determining the time differences between successive layer boundary reflections and multiplying these time differences by the calibrated sound velocities for each coating layer. Pelt Gages are commonly used in industrial applications, such as for measuring the thickness of a multi-layer coating on automotive bodies for quality assurance purposes. Pelt Gages are available from JSR Ultrasonic of Pittsford, N.Y.

In the automotive industry, the thickness of the coating on sample vehicle bodies is measured to determine deviations in the coating process. For example, in a typical plant, three cars out of 1000 cars produced per day may be checked for coating quality. The worker takes Pelt Gage measurements at a selected number of locations on the vehicle body, for example, such as 105 spaced locations. Each vehicle body has a multi-layer coating on the metal surface. These layers usually include, a phosphate coating (not measured by the Pelt Gage); an E Coat which is a corrosion coating; a primer coating; a base coat (the color coat); and finally a clear coat. The Pelt Gage measures the thickness of four layers, entering four values for each location into the systems computer data base. The thickness measurements for all locations are then averaged for the vehicle, and for each of the four layers. Typically, the raw data as well as the averages for up to 23 vehicles are stored in a data base, over a period of several days.

The user also inputs into the data for each vehicle the plant location, the booth location in the plant, the color of the base coat, the date and the location on the vehicle of each thickness measurement. Thus, several hundred items of data are recorded and stored for each vehicle.

The information is then down loaded on a disc and the information printed to manually generate Statistical Process Control (SPC) charts to determine if the pattern or trend of selected thickness measurements are acceptable, or unacceptable. If unacceptable, the reasons for the deviation are determined and the coating equipment adjusted.

In some cases trends can only be determined by referring to a historical data base. For example, some vehicle colors are infrequent, therefore several weeks data must be searched to obtain sufficient data for trends of certain color combinations.

Once this data is presented, the manufacturing facility, if utilizing statistical controls for film thickness readings, must manually translate the data by surface area, by color, and/or color group and/or painting location and/or style of manufactured part and hand generate one or more of three statistical control charts from these readings. These control charts would either be an individual X BAR (average thickness vs. time), R CHART (range of thickness vs. time), an Individual and Moving Range Chart or an X BAR (average thickness vs. time) and S CHART (standard deviation vs. time). The labor time required to generate and maintain these charts is substantial.

Previous attempts at generating statistical control charts from Pelt Gage measurements suffer from a number of disadvantages; for example, substantial labor time must be allocated at each manufacturing facility to transcribe the Pelt Gage data and either maintain or generate a statistical control chart:

(a) of each surface area measured;

(b) of each painting booth within the plant;

(c) for each style of manufacturer product that is produced;

(d) for each color group or individual color that is used on the painted product;

(e) for each coating type that is used on the painted product;

(f) for specific time frames where process improvements or evaluations are being conducted;

(g) for a customized chart where process improvements or evaluations are being conducted.

Substantial paint waste occurs because of the delay in identifying trends, thus resulting in excessive rework of the product.

SUMMARY OF THE INVENTION

The broad purpose of the present invention is to improve the utility of Pelt Gage measurements in controlling the coating thickness of a plurality of multi-layer coated workpieces by using computer operated means to assist in making printed representations of the thickness trends of selected coatings by plant, by colors, by color groups, by surface areas such as the hood, deck lid, right and left side, by color coatings on the same vehicle etc. to correct deviations from the acceptable thickness standards.

The preferred embodiment of the invention uses software in a computer that generates one of three statistical control charts from the Pelt Gage's raw surface area data readings. Decisions, based on statistical analysis, can then be made on the paint application equipment. The improved paint quality of the manufactured part reduces the financial and material waste associated with repainting (reworking) the vehicle.

Accordingly, several objects and advantages of the present invention include incorporating a software program within a manufacturing facility, that generates statistical control charts:

(a) of each surface area measured with a Pelt Gage, thereby reducing labor costs and material wastes;

(b) of each painting location measured with a Pelt Gage, thereby reducing labor costs and material wastes;

(c) of each style of manufacturer product measured with a Pelt Gage, thereby reducing labor costs and material wastes;

(d) of each color group or individual color measured with a Pelt Gage, thereby reducing labor costs and material wastes;

(e) of each coating type measured with a Pelt Gage, thereby reducing labor costs and material wastes;

(f) of specific time frames with raw data measured with a Pelt Gage, thereby reducing labor costs and material wastes;

(g) of process improvements or evaluations of raw data measured with a Pelt Gage, thereby reducing labor costs and material wastes;

(h) on a timely basis with data taken by a Pelt Gage thereby identifying trends which will reduce the number of reworks;

(i) of specific time frames with raw data measured with a Pelt Gage, thereby reducing labor costs and material wastes;

(j) with a scaleable y-axis with raw data measured with a Pelt Gage, thereby providing easier interpretation of film build data;

(k) with colored control limit lines and square marker identification with raw data measured with a Pelt Gage, thereby providing easier interpretation of film build data;

(l) permitting manual insertion or calculated capabilities of history bars: A-Bar, B-Bar and control limit lines with raw data measured with a Pelt Gage, thereby providing easier interpretation of film build data; and (m) providing an autoprocess function that allows the user to print or preview all standard and/or custom charts in selected combinations with any surface area and/or style measured with raw data measured with a Pelt Gage, thereby providing easier interpretation of film build data.

The integration of a computer-generated statistical control chart with raw data generated from the Pelt Gage will substantially reduce labor time in any manufacturing facility. This provides the user with real time data on a timely basis to address paint quality issues.

These issues can be focused on a specific surface area, time frame, coating type, manufacturer style, individual color or color group and painting location. This, in turn, will lower the amount of reworks and all the associated material and labor costs.

Furthermore, the integration of a software program that generates statistical control graphs with raw data generated from the Pelt Gage has the additional advantages in that:

a) as the amount of reworks are reduced through statistical analysis, the user can reduce paint usage and the associated clean-up costs associated with this process;

b) the user can avoid excessive paint reducing solvent usage and costs; and c) the user can reduce paint sludge generation, excessive paint sludge disposal costs, and excessive paint sludge transportation costs.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
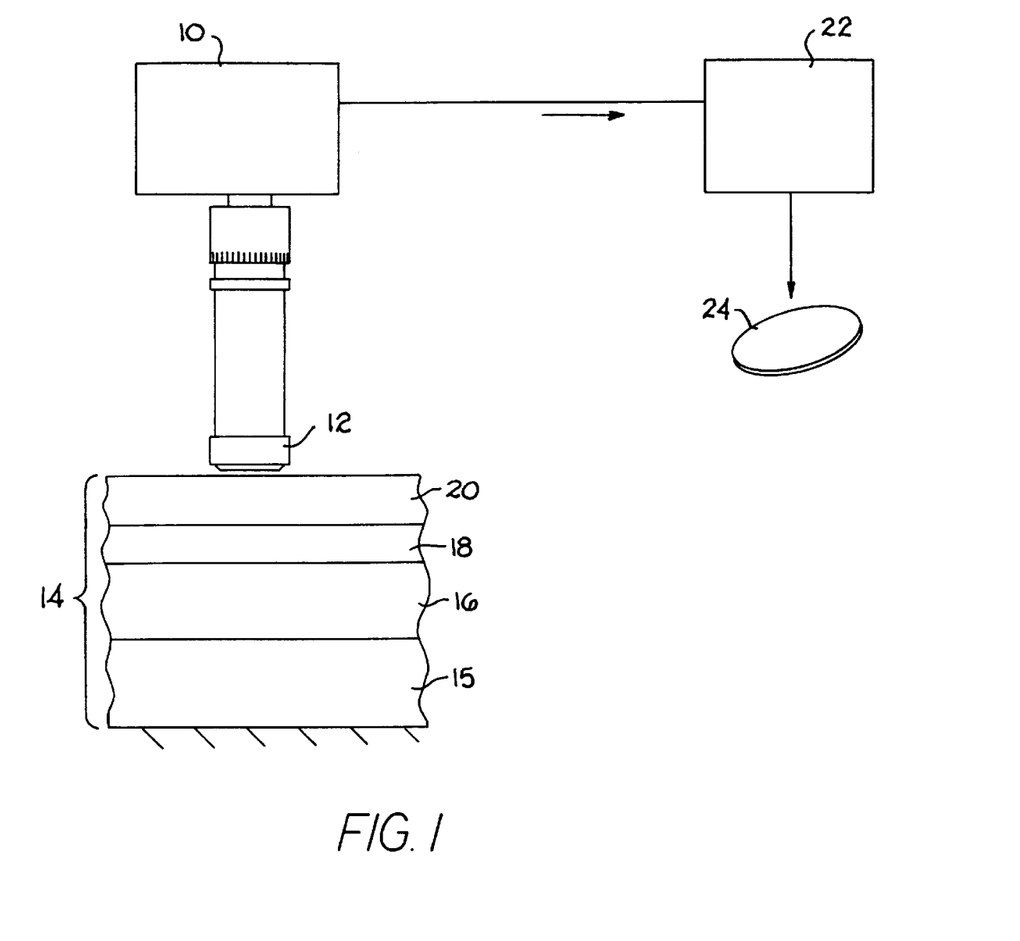
FIG. 1 is a representation of a Pelt Gage taking a measurement of a multi-layer coating on a workpiece to provide thickness data for use in the present invention.

FIG. 1 illustrates a Pelt Gage 10 which includes a transducer 12 used in the conventional manner to make a contact probe of a multi-layer coating 14 of a vehicle body which may be plastic or metal. For illustrative purposes the substrate has an E coat 15, a prime coat 16, a color coat 18 and a clear coat 20. The Pelt Gage measures the thickness at 105 locations on the vehicle body. The thickness readings of each coat at each location is transmitted to the system's computer 22. This raw data includes a measurement of the film (layer) thickness of each of the four layers (coats). The user inputs data of the plant location, the booth location, product information, color data, other special data and the time of the measurement.

The locations of the measurements are determined numerally in various ways. For example, the readings are in some plants taken in a sequence such that the number of the reading identifies the location such as the hood etc. on the vehicle of the measurements. See, for example, Appendix A. The readings for each film on the vehicle are averaged by adding up the thickness of the same film for each of the locations and dividing by the number of locations. The data is stored for 23 vehicles and accumulated over a period of days. Daily the new data and the data for the previous days are transferred to a suitable media, such as a disc 24. Disc 24 with the data is then used in either the same computer or another computer with sufficient memory and a processor which can interact with the preferred program. It may be either a stand alone computer system or incorporated within the Pelt Gage computing system. For illustrative purposes, we shall use the Pelt Gage system computer.

Figure 2A:
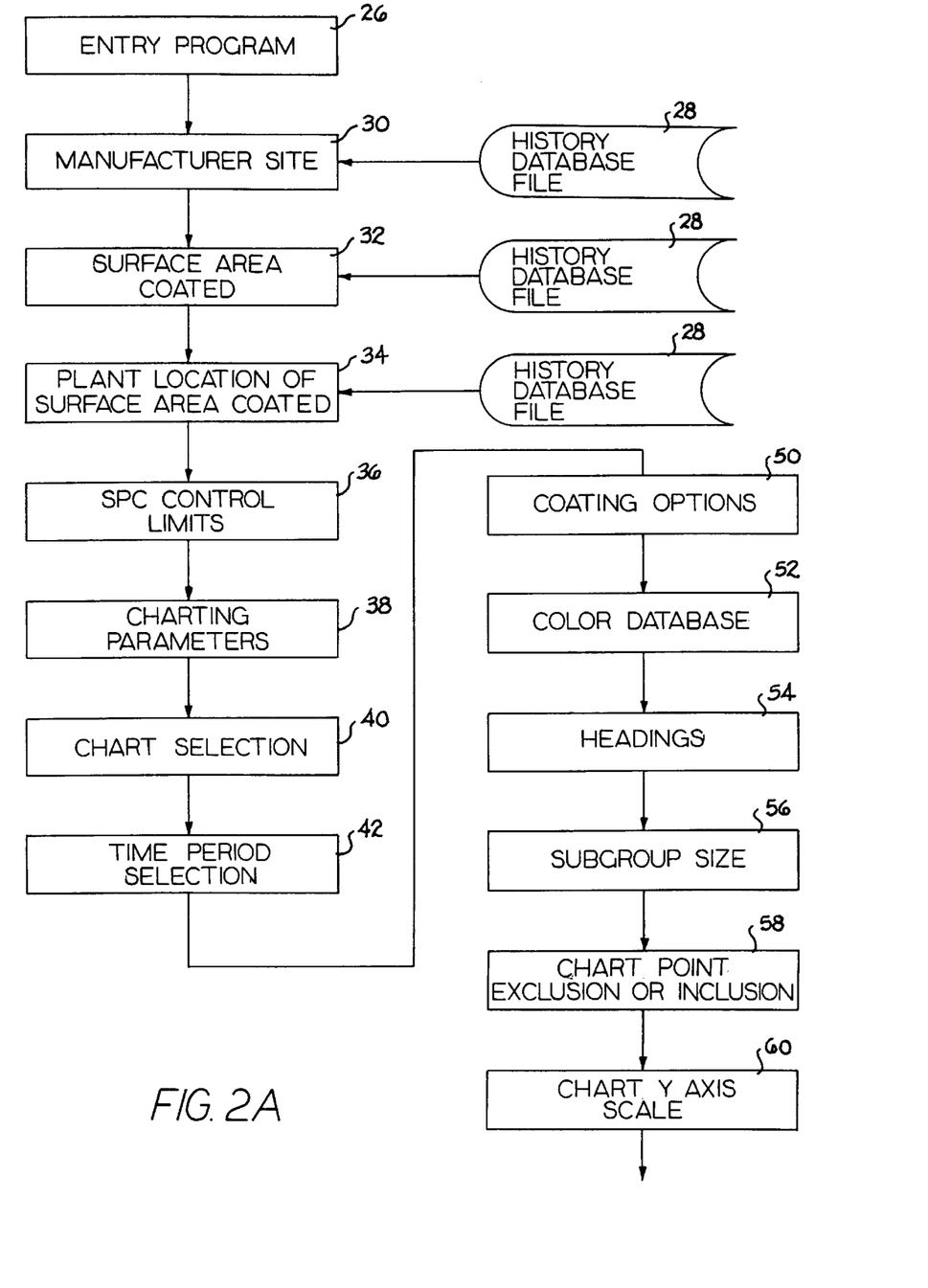
FIGS. 2A, and 2B show a block diagram of the steps for executing the present invention.

Referring to FIG. 2A, a statistical entry software program 26 is entered into the data processing computer. A Pelt Gage historical data base file 28 is maintained in the computer and has raw data and daily averages which may extend back for two years. To use the data to create a chart, in step 30, the user selects the desired manufacturers site, that is the geographical location of the plant. In step 32, he selects the desired surface area of the sample vehicles, such as the hood, the deck lid etc.

In step 34, the user selects the painting booth or location in the plant that is to be charted.

In step 36, the user selects the Statistical Process Control (SPC) limits appropriate for the chart.

In step 38, he selects the charting parameters, that is, the desired scale of the chart. In step 40, he selects the film (layer) data that is whether all data or only selected data for the film. In step 42, he selects the dates from which the thickness data is measured.

In step 50, the user selects the particular coating layer to be charted, that is whether the E coat, the prime coat, the base coat, or the clear coat.

In step 52, the user selects the color that is to be investigated such as red. The computer will then select from the historical data base sufficient measurements on red vehicles to generate the desired trend.

In step 54, the user selects the headings for the chart.

In step 56, the user selects the vehicle location. For example, instead of charting the average thickness for the entire vehicle or several vehicles, he may select just certain subgroups of the vehicle readings, such as the hood and the thickness of a selected coating, such as the prime coat red on the vehicles measured during the selected dates.

In step 58, the user decides whether he wants to use certain raw data, such as on certain dates or certain locations or add information for special charts.

In step 60, he selects the scale of the Y axis of the chart.

Figure 2B:
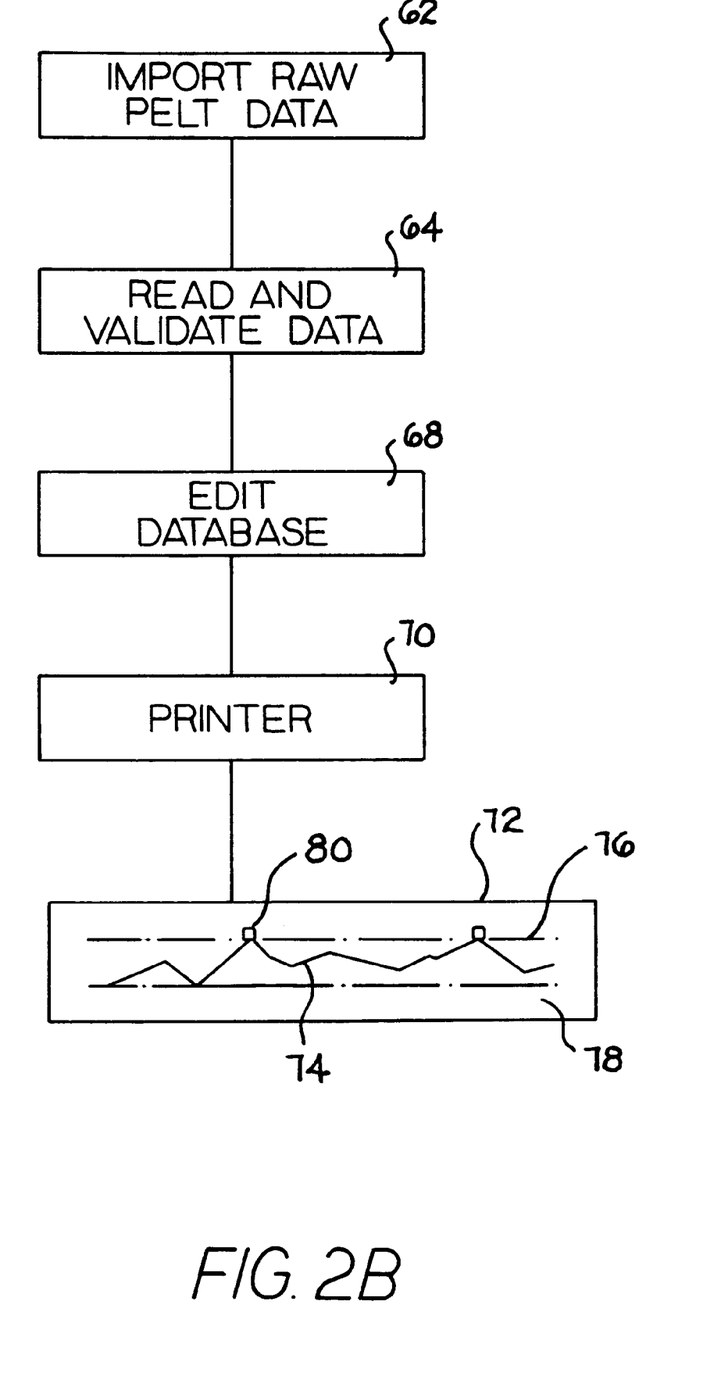

In step 62, the user inserts the disc with the Pelt Gage measurements of raw data and averages for the current date into computer 22. In step 64 he examines and validates the data, for example, if there is insufficient data to create an acceptable trend line, he may enlarge the number of dates or the number of vehicles measured. In step 68, he corrects any obvious errors in the raw data. The computer then makes the necessary analysis typically by adding up all the measurements that have been selected for the different parameters and dividing by the number of readings to create an average value that may be charted. It also uses standard statistical formulas to generate 1–3 standard statistical charts such as an individual X BAR, R CHART, Individual and Moving Range Chart or a X BAR and S CHART.

The values are sent either to a computer-operated printing device 70 which creates a visual chart 72 which may be on paper, or some other type of visual representation such as a computer monitor. The trend lines 74 of the averages are then visually compared against the statistical control limits 76 and 78. The computer highlights readings that are beyond the control limits by making those particular values in the form of a square, such as at 80, and in a color such as red to highlight the deviation. Based on this data the user can quickly make further charts to pinpoint the cause for the deviation and make the necessary corrections in the painting equipment (not shown) or process.

Appendix A illustrates the typical readings taken on a particular vehicle, for example, a clear coat film.

Appendix B is a typical SPC chart illustrating the readings taken over several days of the clear coat film.

Appendix C illustrates a trend chart created by using the invention to highlight deviations from acceptable thickness and measurements.

APPENDIX A

APPENDIX B

APPENDIX C

Having described my invention, I claim:

1. A process for monitoring a change in the thickness of individual layers of a multi-layer coating applied on a plurality of workpieces from data acquired from measuring with a pulse echo layer thickness (pelt) gage, the individual thickness of the multi-layer coating in a plurality of locations on individual workpieces with a probe connected to an electronic memory to provide a set of raw data of the individual workpiece measurements; and recording in an electronic memory the set of raw data, said process comprising the steps of:

pooling and recording in said electronic memory the pool of raw data thickness measurements of the set of raw data of the individual workpieces;

using computer-operated means to average thickness data selected from the recorded thickness data of the multi-layered coatings of either a single selected layer or a combination of at least two layers of a selected number of said plurality of workpieces to determine a trend of changing layer thickness thereof; and displaying the trend as a graphical representation in a computer generated picture.

2. A process as defined in claim 1, in which the pool of data include certain of said workpieces have a first undercoat layer and other of said workpieces have a second undercoat layer, and including the step of averaging a combination of the thickness of the clear coat and a selected one of said undercoats to display a trend thereof.

3. A process as defined in claim 1, including the steps of using the computer-operated means to determine a range of acceptable values for the selected thickness data, displaying the range of acceptable data in the picture, and comparing the trend to the range of acceptable values in the picture.

4. A process as defined in claim 1, including the step of compiling and displaying a picture of the raw data generated from the Pelt Gage in the computer into 1 of 3 or all 3 statistical control charts: individual X Bar and R Chart, X Bar and S Chart, Individual and Moving Range Chart.

5. A process as defined in claim 1, including the step of:

compiling in the computer the raw data generated from the Pelt Gage and generating with a printer statistical control charts of a specific surface area of selected workpieces.

6. A process as defined in claim 1, including the steps of: compiling in the computer the raw data generated from the Pelt Gage, and generating with a printer statistical control charts of a specific painting location on selected workpieces.

7. A process as defined in claim 1, including the steps of compiling in the computer the raw data generated from the Pelt Gage, and generating with a printer statistical control charts of the trend of a specific style of a manufacturer's product.

8. A process as defined in claim 1, including the steps of generating the thickness trend of a specific color from selected workpieces.

9. A process as defined in claim 1, including the step of generating the thickness trend of a selected coating type from thickness data of selected workpieces.

10. A process as defined in claim 1, including the step of generating the trend of thickness data of a plurality of work process coated during specific time frames where process improvements or evaluations are being conducted.

11. A process as defined in claim 1, including the step of generating standard and/or custom charts of thickness trends in selected combinations with a selected surface area and/or style.

12. A process as defined in claim 1, including the step of printing a table listing the raw or averaged data for easy reference and interpretation.

13. A process for monitoring the thickness of individual layers of a multi-layer coating applied on a plurality of workpieces, the multi-layer coating including a top layer of a clear coat, comprising the steps of:

measuring with a pulse echo layer thickness (pelt) gage, the individual thickness of a top clear coat layer and a plurality of undercoat layers of a multi-layer coating in a plurality of locations on a plurality of workpieces with a probe connected to an electronic memory to provide a set of raw data of the individual measurements of said workpieces;

recording in said electronic memory the set of raw data thickness measurements of the plurality of workpieces;

using computer-operated means to compile average thickness data from the recorded data of said clear coat layer and a selected undercoat layer, to determine a trend of changing thickness of the clear coat layer and the selected undercoat layer; and displaying the trend as a graphical representation in a computer-generated picture.

14. A process for monitoring the thickness of a multi-layer coating in a plurality of locations on a plurality of workpieces, the coating of some of the workpieces having a first base color undercoat and others of the workpieces having a second base color undercoat, the multi-layer coating applied to each of said workpieces including a top layer of a clear coat, said process comprising the steps of:

measuring with a pulse echo layer thickness (pelt) gage, the individual thickness of the clear coat layer and the base color undercoat of a multi-layer coating having at least three coating layers including a top clear coat layer, in a plurality of locations on a plurality of workpieces, with a probe connected to an electronic memory to provide a pool of raw data of the individual thickness measurements, recording in said electronic memory said pool of raw data thickness measurements;

using computer-operated means to compile average thickness data from the pool of raw data of a combination of a selected layer of said base color undercoats and said top clear coat layer of the multi-layer coatings to determine a trend of changing thickness of the combination of layers; and displaying the trend as a graphical representation in a computer-generated picture.

* * * * *